United States Patent
Bergstrøm

(10) Patent No.: US 9,993,789 B2
(45) Date of Patent: Jun. 12, 2018

(54) REACTOR FOR A CATALYTIC PROCESS

(71) Applicant: Haldor Topsøe A/S, Kgs. Lyngby (DK)

(72) Inventor: Jesper Bergstrøm, Lyngby (DK)

(73) Assignee: Haldor Topsoe A/S, Lyngby (DK)

( * ) Notice: Subject to any disclaimer, the term of this patent is extended or adjusted under 35 U.S.C. 154(b) by 0 days. days.

(21) Appl. No.: 15/120,314

(22) PCT Filed: Feb. 16, 2015

(86) PCT No.: PCT/EP2015/053206
§ 371 (c)(1),
(2) Date: Aug. 19, 2016

(87) PCT Pub. No.: WO2015/124527
PCT Pub. Date: Aug. 27, 2015

(65) Prior Publication Data
US 2017/0065955 A1    Mar. 9, 2017

(30) Foreign Application Priority Data
Feb. 20, 2014 (EP) .................................. 14155885

(51) Int. Cl.
| | |
|---|---|
| *B01J 8/00* | (2006.01) |
| *B01J 8/04* | (2006.01) |
| *B01J 19/30* | (2006.01) |
| *B01J 8/44* | (2006.01) |
| *B01J 8/02* | (2006.01) |

(52) U.S. Cl.
CPC ............... *B01J 8/008* (2013.01); *B01J 8/025* (2013.01); *B01J 8/04* (2013.01); *B01J 8/0449* (2013.01); *B01J 8/44* (2013.01); *B01J 19/305* (2013.01); *B01J 2208/00884* (2013.01)

(58) Field of Classification Search
CPC .... B01J 8/008; B01J 8/44; B01J 2208/00884; B01J 19/305
See application file for complete search history.

(56) References Cited

U.S. PATENT DOCUMENTS

| | | | |
|---|---|---|---|
| 2,745,722 A | 5/1956 | Lacoste | |
| 2,860,860 A | 11/1958 | Wilson | |
| 4,381,018 A * | 4/1983 | Gernez | B01J 8/44 118/DIG. 5 |
| 5,603,904 A * | 2/1997 | Bachtel | B01J 8/008 422/143 |
| 5,891,405 A * | 4/1999 | Bianchi | B01J 8/008 277/650 |
| 2013/0064731 A1 | 3/2013 | Boyak et al. | |

FOREIGN PATENT DOCUMENTS

WO    WO 2012/125888 A1    9/2012

* cited by examiner

*Primary Examiner* — Lessanework Seifu
(74) *Attorney, Agent, or Firm* — Blank Rome LLP

(57) ABSTRACT

A reactor for a catalytic process comprising one or more catalyst beds has catalyst bed supports constructed as a grid comprising a plurality of cassettes (01), which are covered with easily removable screens (02). The down-time and service costs for the reactor are thereby lowered.

9 Claims, 4 Drawing Sheets

REACTOR FOR A CATALYTIC PROCESS

FIELD OF THE INVENTION

This invention relates to a reactor comprising catalyst support, specifically a multi-catalyst-bed hydroprocessing reactor with a catalyst support for each catalyst bed. Specifically, the catalyst support is for use in radial flow and down-flow catalytic reactors which include vertically superimposed packed beds of particulate catalytic material wherein a liquid, liquid and gas mixture or vapour is processed as it flows down through the packed beds. This type of reactor is used in the petroleum and chemical processing industries for carrying out various catalytic reactions, such as sulphur and nitrogen conversion (HDS/HDN); hydrogenation of: olefins (HYD) and aromatics (hydrodearomatisation—HDA), metals removal (hydrodemetallisation—HDM), oxygen conversion (hydrodeoxygenation—HDO) and hydrocracking (HC) and synthesis reactions.

BACKGROUND OF THE INVENTION

Hydroprocessing is taking place in a hydroprocessing catalytic reactor which is the key element of a hydroprocessing unit. Hydroprocessing catalytic reactors can have single or multiple catalyst beds. The number of catalyst beds within one reactor follows from the calculation of the maximum height of the bed, in the individual process and function. This is decided based on a number of constraints. These include catalyst activity and selectivity, catalyst lifetime, flow distribution considerations and safety.

The one or more catalyst beds in the reactor need to be supported to retain the catalyst but the support must enable process fluid to flow through the support to be processed In the reactor bed(s). Catalyst support grids in the reactor are built by a number of cassettes, each with a weight of 100-500 kg. As crane time often determines the time for assembly and disassembly of the catalyst support grid, the disassembly time is often in the range of 2 days, roughly the same as the assembly time. The catalyst support grid is covered by a screen for retaining the catalyst pellets. To enable through-flow of process fluid, the screen may be made of for example woven wire-mesh, flat printed pattern or welded wires and rods.

During operation, the functionality of the screen may be affected for example by coke deposition, by damaging during handling such as scaffolding on top of the screen, and occasionally by corrosion. When damaging occurs, the support grid needs to be dismantled, the affected cassette is brought to the workshop, where it is cleaned and repaired. Dismantling and reparation is cumbersome and time consuming. Some types of screens, e.g. some welded wires and rods screens may not be able to be repaired and the whole cassette needs to be replaced by a new.

US2012237415 discloses a modular catalyst bed support can be used to increase the number of catalyst beds available in a reactor. The modular catalyst bed support can include a lattice with a plurality of lattice openings and modules inserted into the lattice openings. The modular catalyst bed support can rest on top of an underlying catalyst bed, which can reduce or eliminate the need for attachment of the modular catalyst bed support to the walls of the reactor.

US2013064731 is directed to an upwardly convex fixed-bed catalyst support for a hydroprocessing reactor. The catalyst bed support includes an upwardly convex annular-shaped plate having an outer end in communication with the reactor inner surface, and an inner end in communication with a horizontal hub assembly.

U.S. Pat. No. 2,745,722 describes a reactor comprising a wall defining a reaction chamber containing a horizontally disposed bed of finely-divided catalyst, calking apparatus for depositing a supply of fresh catalyst about the peripheral edge of said catalyst bed in order to compensate for radial contraction thereof, said calking apparatus comprising a gas-tight seal in said wall above said catalyst bed, a rotatable conduit of comparatively small cross-sectional area entering said chamber through said seal and terminating in a discharge end at a point above and in proximity to the peripheral edge of said catalyst bed, and means connected to said conduit for maintaining said discharge end of said conduit above and in close proxitnity to said peripheral edge as said conduit is rotated.

U.S. Pat. No. 2,860,860 is describing a tray deck for a gas-liquid contact column. It comprises a number of parallel spaced beams extending across the column and supported at their ends by an annular flange secured, e.g. by welding, to the shell of the column and a plurality of deck sections which extend transversely between adjacent beams and which have along their transverse edges downwardly projecting stiffening flanges extending between the beams. The deck is completed by deck sections which rest partly on a beam and partly on the flange, the edges of the sections adjacent the shell being curved. The beams are secured to the flange by clamping members secured together by a bolt which may pass through a hole in the top flange of a beam or the upper flange may be notched to accommodate the stem of the bolt. The deck sections may be made of light gauge sheet metal, e.g. of stainless steel, nickel or "Monel" metal, (R.T.M.) and are of such sizes that a space is left between adjacent sections on the beams and between the sections and the shell of the column to allow for expansion. The sections have series of punched out slots with sharp or rounded corners to provide an aggregate slot area of between 7 and 50 per cent of the total tray area. The sections have centrally disposed reinforcements secured to their undersides and the transverse marginal edges of the sections are bent downwardly to form the stiffening flanges and may also have a tip turned inwardly from a flange under a reinforcement. The longitudinal edges of the sections extend beyond the flanges. The sections are of similar construction except that they have only one transverse stiffened edge and the reinforcements stop short of the curved edges of the sections. The sections are secured to the beams by bolts and washers, the washers being of such size as to overlie the marginal portions of adjacent sections and the seams of the bolts passing between the sections which are notched for this purpose if necessary. A section is provided in each tray deck to serve as a man-way and is secured by fasteners having removable nuts at both ends of a threaded bolt to a central portion of which is secured a plate adapted to lie between adjacent longitudinal edges and prevent rotation of the fastener.

US2012156111A discloses structure and method for adding a catalyst bed platform to an existing reactor without welding to the structural portion of the reactor walls. The structure is constructed from components that can be passed through an existing opening in a reactor. The structure allows a catalyst bed in an existing reactor to be divided into catalyst beds with a reduced length to diameter ratio.

U.S. Pat. No. 5,891,405A describes an exothermic heterogeneous catalytic synthesis reactor including at least one catalytic bed arranged in a cylindrical shell and provided with a bottom plate for containment of the catalyst, and at least one supporting shoulder for the bottom plate extending from the shell, includes a catalyst-seal support device including an annular element placed between the shoulder and the bottom plate. The annular element is fixed in a removable manner with the bottom plate and has a thermal expansion coefficient substantially equal to that of the shell.

EP0602288 discloses a moving catalyst bed reactor comprising a normally vertical cylindrical vessel provided at its upper end with a catalyst inlet and a reactant inlet and at its lower end with a catalyst outlet and an effluent outlet, and with a separation device arranged in the vessel near its lower end, the separation device comprises a downwardly tapering catalyst support having an outer edge which is joined to the wall of the vessel and a central opening which communicates directly with the catalyst outlet, the catalyst support is provided with perforations and with fluid withdrawal devices having screens preventing catalyst from passing which fluid withdrawal devices are arranged over the perforations and joined to the catalyst support.

In U.S. Pat. No. 6,878,351, a catalyst support structure e.g. for use in an ammonia oxidation reactor is disclosed, comprising a series of primary supports disposed above a catalyst bed, a lattice assembly disposed beneath the catalyst bed and on which the catalyst bed rests, said lattice assembly being suspended from the primary supports by suspending means extending through the catalyst bed. Preferably the support structure includes a static start-up burner arrangement in the form of one or more perforated tubes adjacent the primary supports.

In WO9110496, A catalytic reactor for gas phase reactions is disclosed. The reactor includes a housing, a porous catalyst support plate within the housing, a bed of catalyst particles within the housing and a fibrous filter pad extending across the housing to prevent transport of catalyst particles from the housing. The filter pad is resistant to clogging and imposes a low pressure drop across the reactor.

U.S. Pat. No. 5,527,512 discloses a light-weight and easily manufacturable catalyst support structure, which allows fluid flow into a catalyst bed in uniform distribution. The support structure, used for supporting a moving catalyst bed within a moving bed reactor having an upward flowing fluid phase, is formed in a cone-like shape in which the diameter enlarges upward. The supporting structure comprises a shell-like support member, a first mesh layer comprising thick mesh elements, and a second mesh layer having a mesh size which does not allow catalyst particles to pass through. The first mesh layer overlays the support member, and the second mesh layer overlays the first mesh layer. The shell-like support member includes a circular bottom plate extending perpendicular to the center line of the reactor, and a side wall having a truncated cone shape which extends upward from the edge of the bottom plate. The bottom plate and the side wall are primarily made of perforated plates through which the fluid passes. A plurality of cylindrical flow guides of different diameters are provided underneath the shell-like support member.

There is a need for a reactor with a catalyst support which can be easily and quickly serviced and replaced to lower the down-time of the reactor and thus lower the service costs.

SUMMARY OF THE INVENTION

Accordingly the present invention provides a reactor with a catalyst support which is easily serviced since it has a screen part which can be quickly removed and replaced without disassembly of the cassettes of the support grid. In some embodiments, the screen may even be replaced by the use of hand-force only.

The reactor suited for a catalytic process according to claim 1 of the invention, is a reactor with one or more catalyst beds, each bed comprises a plurality of catalyst pellets. To contain the catalyst beds, the reactor comprises a bottom support for each catalyst bed. The support is constructed as a grid e.g. as a number of steel beams and further comprising a number of cassettes, which rest on the beams. The cassettes are sealed together to prevent by-pass of the process gas, which would result in an uneven flow of the process gas through the chemically active catalyst bed. Because of the grid structure of the cassettes, the process gas is able to pass through the cassettes, but since the catalyst pellets are normally smaller than the apertures in the cassette grid, a further screen is applied on the top of the cassette grid, with apertures large enough to allow flow through of process fluid, but small enough to retain the catalyst pellets and hence together with the grid they form a bottom support for the catalyst bed.

The cassettes may each have a weight of 100-500 kg. Therefore the crane time may determine the time for assembly and disassembly of the catalyst support grid, as explained above. This makes assembly and disassembly of the catalyst bed support slow and expensive. To solve this problem the screen applied on the top of the cassette grid is removable fastened to said cassette according to claim 1. Hence the screen can be removed by hand power, since it is much lighter in weight than the total cassette.

In a particular embodiment of the invention, the apertures of the screen each has an area of between 500 $mm^2$ and 0.1 $mm^2$. The area of each aperture is according to claim 1 off course small enough to retain the catalyst pellets, since this is the function of the screen. But to lower the pressure loss of the process gas and to save material and production costs, the aperture size may be made as large as possible while still keeping the supporting function. Since the catalyst particles may break during operation, it may be necessary to account for smaller particles than the actual catalyst particle size when loaded into the reactor. The shape of the apertures may be any suitable shape regarding function and cost of manufacture. Examples are quadratic, rectangular or any other suitable shape. In a further embodiment of the invention, each aperture of the screen has an area of between 100 $mm^2$ and 1 $mm^2$ for the same reasoning as explained above.

In further embodiments of the invention the screen is made in a range of structures. In one embodiment the screen is made by a woven wire mesh. The wire is strong enough to carry the weight of the catalyst bed as well as the pressure induced to the catalyst bed by the flow of the process gas during operation. The screen may however be supported by the underlying support grid of the cassette and in such case the dimension of the wire may be reduced. To support the wire mesh, this embodiment of the invention may further comprise an outer frame to which each end of the wires in the wire mesh is fixed. In a variety of this embodiment the mesh may instead of only wire, be a combination of wire and rods welded together. In this variety, the rods contribute to the strength of the screen to a larger amount than the wire due to the rods higher strength.

In a further embodiment of the invention, the screen may comprise a flat printed pattern, e.g. in the form of a steel plate with a pattern of apertures in the plate made in any known way of the art. The apertures may thus be made by stamping or laser cutting of the steel plate.

In a specific embodiment of the invention, the weight of the screen is below 100 kg, which makes it removable by hand power when using hand tools and the hand power of more than one person. In a further embodiment of the invention, the screen may even be removable by the hand power of a single man as the weight of the screen in this embodiment is below 25 kg.

In an embodiment of the present invention, the screen is fixed to the underlying cassette by quick release means. This enables the screen to be fixed to or detached from the cassette by hand or by hand tools in less than 30 minutes or even in less than 5 minutes for each screen. The time it takes depends of a variety of parameters e.g. the amount of free space for the personnel to operate in when they service the screen, the weight of the screen, the type of release means etc. The release means may comprise a simple screw or a nut, a hole-nut or a hole-screw, a knee-joint quick release, an eccentric quick release just to mention a few of the many known in the art. As described, the release means may either be operable by hand or with the use of hand tools.

The screen may in a specific embodiment be rectangular in shape and it may be fixed to its underlying cassette in each of its four corners. In a specific embodiment of the invention, the reactor comprises screens of which a majority are rectangular. When employing cassettes and screens of rectangular shape in a reactor with a circular cross section, a number of the cassettes and screens will have a shape different from rectangular such as triangular-like with two straight sides and a third side which is arc-shaped, in order to fit the entire cross-section.

In a certain embodiment of the invention, the reactor is a hydroprocessing reactor, and in a further embodiment of the invention, the reactor is used for a hydroprocessing process.

FEATURES OF THE INVENTION

1. Reactor for a catalytic process with one or more catalyst beds of catalyst pellets, comprising a bottom support for each of said catalyst beds, the support is constructed as a grid comprising a plurality of cassettes, each cassette is covered by a permeable screen with apertures large enough to allow flow through of process fluid, but small enough to retain the catalyst pellets, wherein said screen is removable fastened to said cassette and can be exchanged by hand power.
2. Reactor according to feature 1, wherein the apertures of the screen each has an area of between 500 mm$^2$ and 0.1 mm$^2$.
3. Reactor according to feature 1, wherein the apertures of the screen each has an area of between 100 mm$^2$ and 1 mm$^2$.
4. Reactor according to any of the preceding features, wherein the screen is made by woven wire mesh.
5. Reactor according to any of the features 1-3, wherein the screen is made by welded wires and rods.
6. Reactor according to any of the features 1-3, wherein the screen is made by a flat printed pattern.
7. Reactor according to any of the preceding features, wherein the weight of the screen is below 100 kg.
8. Reactor according to any of the features 1-6, wherein the weight of the screen is below 25 kg.
9. Reactor according to any of the preceding features, wherein the screen is fixed to the cassette by means of quick release means, enabling the screen to be fixed to, or detached from the cassette by hand or by hand tools in less than 30 minutes.
10. Reactor according to any of the preceding features, wherein the screen is fixed to the cassette by means of quick release means, enabling the screen to be fixed to, or detached from the cassette by hand or by hand tools in less than 5 minutes.
11. Reactor according to any of the preceding features, wherein a majority of the screens in the reactor are rectangular and each is fixed to a cassette in each of its four corners.
12. Reactor according to any of the preceding features, wherein the reactor is a hydroprocessing reactor, a hydrogenation reactor, a TIGAS reactor, or a methanation reactor.
13. Use of a reactor according to any of the features 1-12 for a hydroprocessing process, a hydrogenation process, a TIGAS process or a methanation process.

BRIEF DESCRIPTION OF THE DRAWINGS

The invention is further illustrated by the accompanying drawings showing examples of embodiments of the invention.

POSITION NUMBERS

01. Cassette.
02. Screen.
03. Frame.
04. Quick release means.
05. Side.
06. Grid of cassette.
07. Threaded rod for quick release means.
08. Flat printed pattern apertures.
09. Supporting edge.
10. Fixing holes.
11. Wire mesh.

DESCRIPTION OF THE DRAWINGS

A number of embodiments of the invention will be explained in more detail in the following with reference to the drawings.

Figure 1:
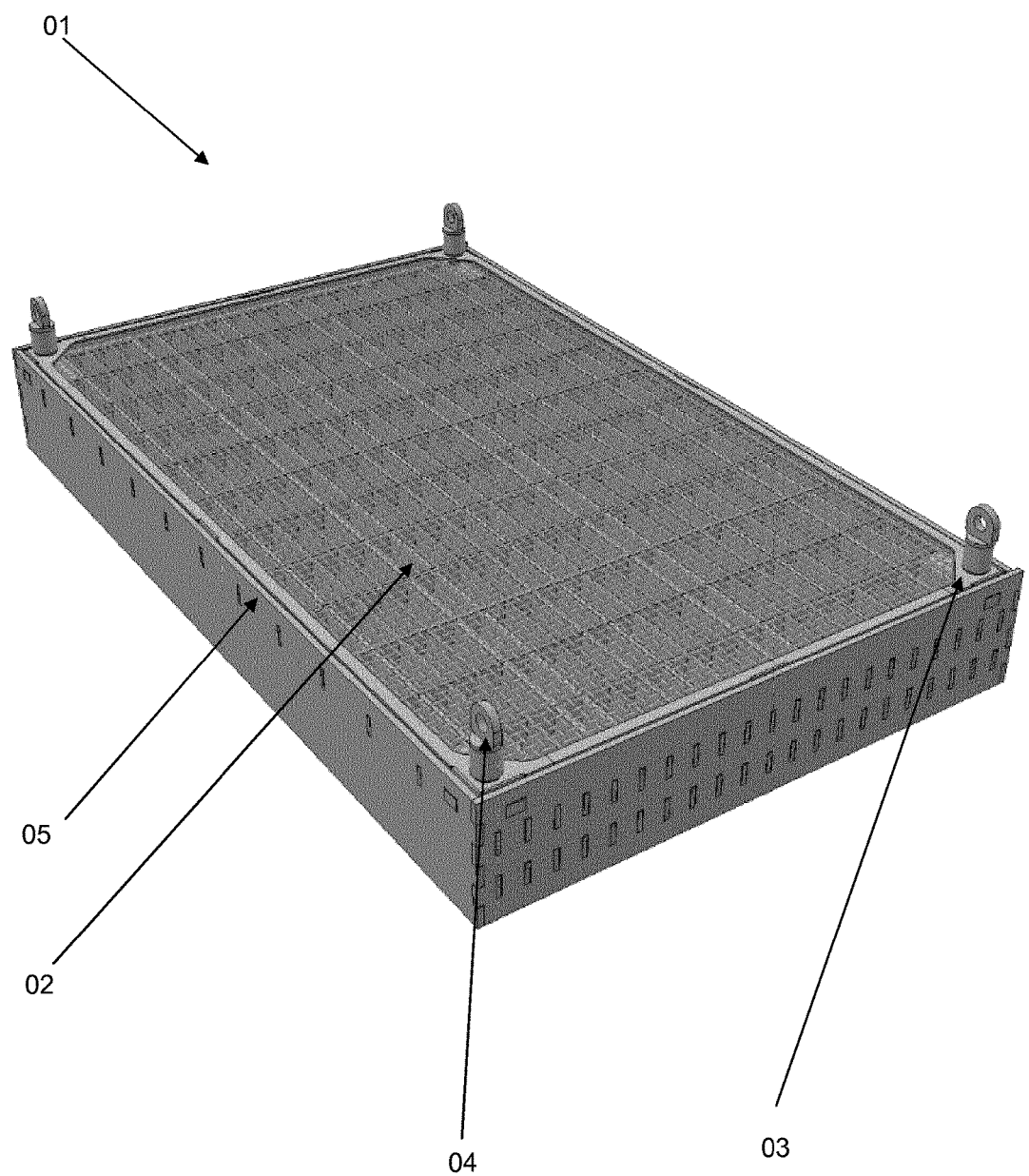
FIG. 1 shows an isometric top view of the cassette with a screen according to an embodiment of the invention.

FIG. 1 shows an embodiment of a cassette 01 which is covered by a screen 02. Placed beside a plurality of similar cassettes (not shown), this serves as a bottom support for a catalyst bed (not shown) in a reactor for a catalytic process with one or more catalyst beds of catalyst pellets. The cassette is rectangular with four sides 05 and has a grid of crossing steel profiles to support the screen. The four side edges of the screen are supported by a frame 03. In this embodiment the screen is a woven wire mesh. The ends of the wires are welded to the frame for stiffness and support. In each corner of the rectangular frame, there is a fixing hole (not shown in this picture) which allows the frame and screen to be fixed to the cassette by means of quick release means 04. In this embodiment the quick release means are eye-nuts which can be easily and quickly unscrewed by means of a hand tool as simple as a rod and hand power. In this way, the screen can be removed for cleaning or replaced in case of damage in very short time, in this embodiment in under 5 minutes. Further, the screen including the frame of this embodiment has a weight of less than 40 kg and thus it can be removed by the power of a single man without the expensive and time-consuming need of crane assistance.

Figure 2:
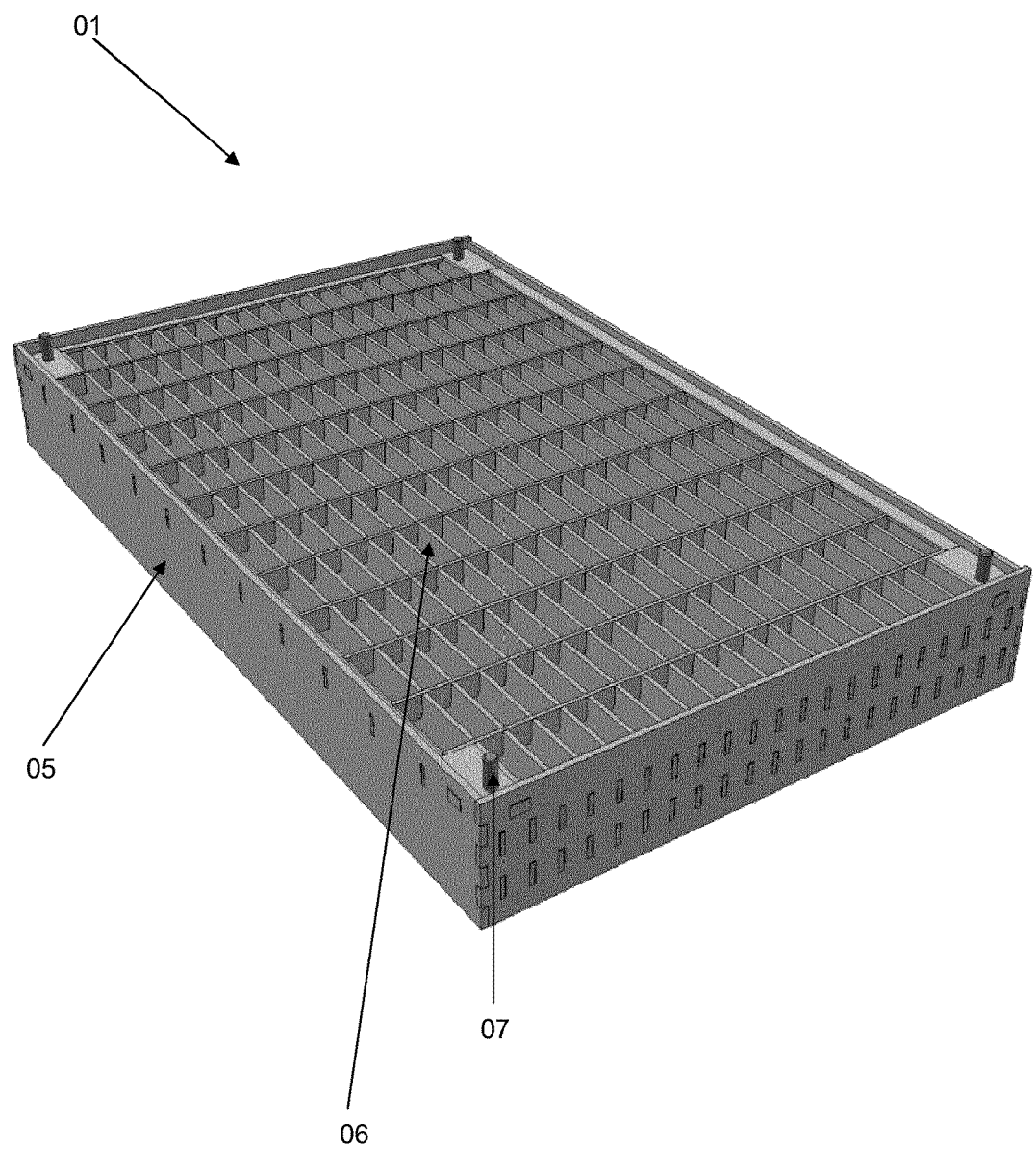
FIG. 2 shows an isometric top view of the cassette without a screen according to an embodiment of the invention.

FIG. 2 shows a cassette similar to the one of FIG. 1, only here shown without the screen and therefore the mentioned grid of the cassette 06 of crossing steel profiles to support the screen can be more clearly seen. To provide strength for the catalyst pellet support but enable process gas flow with as little pressure drop as possible, the steel profiles are tall and slim. Further FIG. 2 shows the cassette without the eye-nuts and hence the threaded rods for the quick release means 07 are visible. Also it is visible how the cassette comprises a base edge on the inside top along all four sides to support the frame of the screen when it is mounted.

Figure 3:
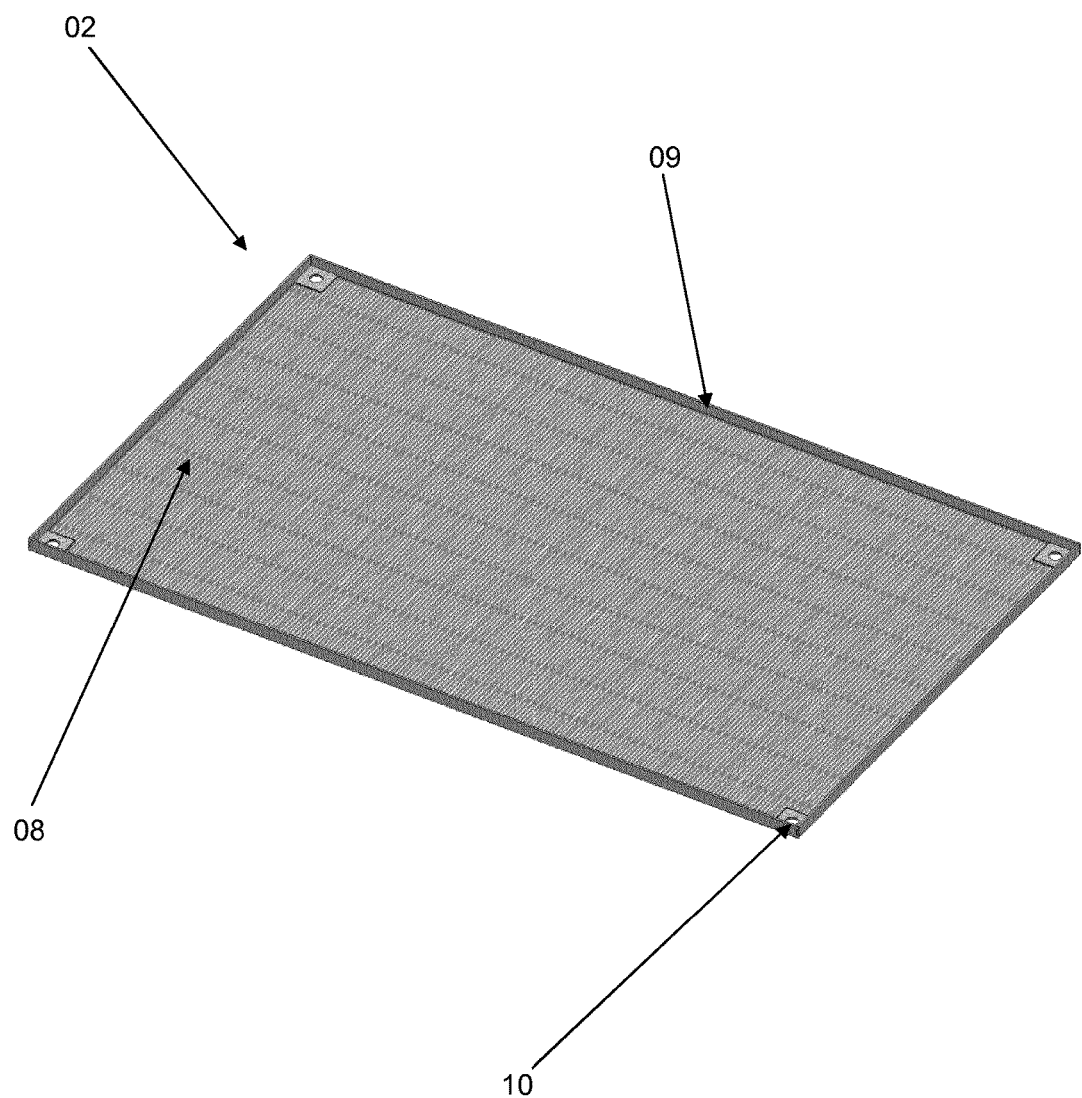
FIG. 3 shows an isometric top view of a screen of a flat printed pattern type according to an embodiment of the invention.
Figure 4:
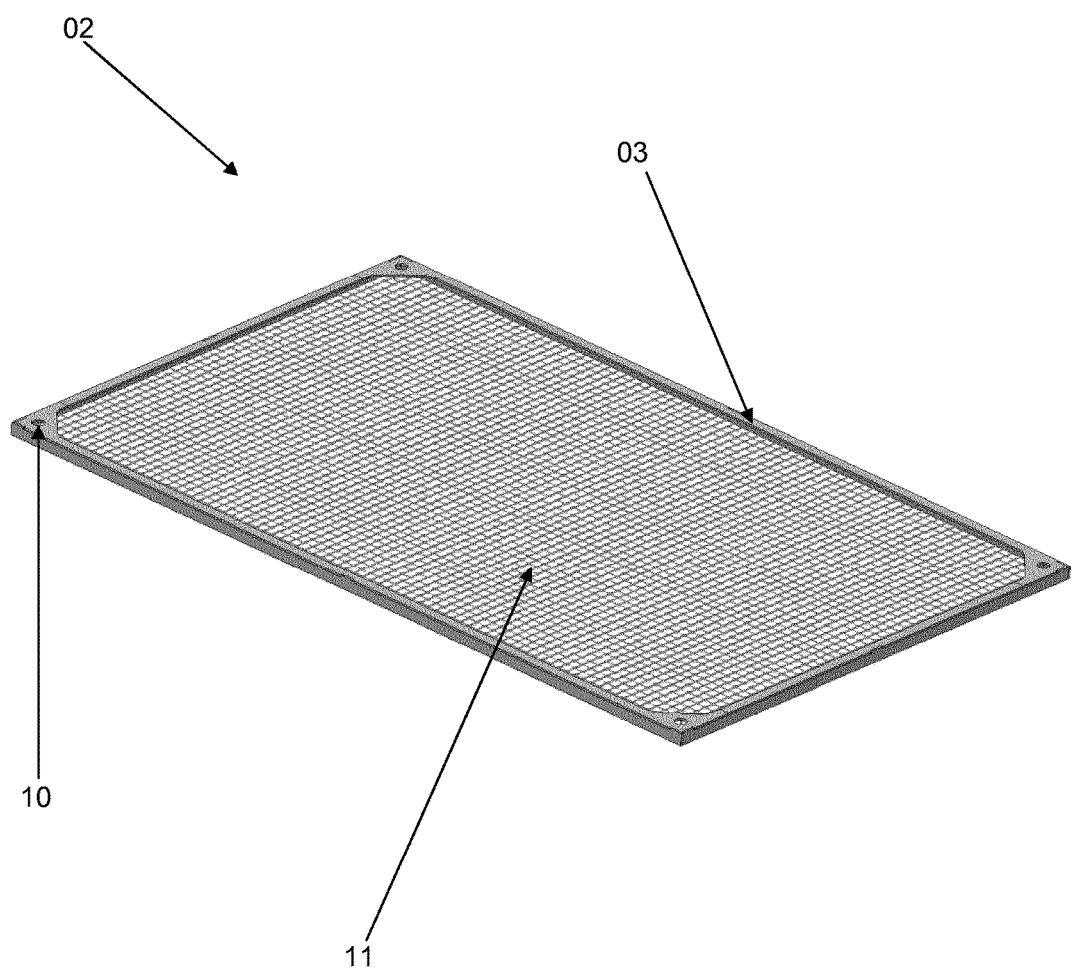
FIG. 4 shows an isometric top view of a screen of a wire mesh type according to an embodiment of the invention.

Different types of screens can be seen in FIG. 3 and FIG. 4. FIG. 3 shows a screen with flat printed pattern apertures 08. This screen may be manufactured from a single piece of metal plate with apertures that are made by for instance laser cutting, stamping or any other suitable process as known in the art. The frame may be omitted, since a supporting edge 09 can be made by bending the four edges of the metal plate. As mentioned above, each of the corners have fixing holes 10, to fix the screen to the cassette.

In the embodiment of FIG. 4 the screen is made from woven wire mesh 11, which is supported by a frame 03 of steel. The ends of the wire can be fixed to the frame e.g. by welding. Each of the frame corners has a fixing hole 10 for fixing the screen to the cassette. The structure of the wire mesh permits support of the catalyst pellets with a minimum of process gas pressure loss.

The invention claimed is:

1. Reactor for a catalytic process with one or more catalyst beds of catalyst pellets, comprising a bottom support for each of said catalyst beds, the support is constructed as a grid comprising a plurality of cassettes, each cassette is covered by a permeable screen with apertures large enough to allow flow through of process fluid, but small enough to retain the catalyst pellets, wherein said screen is removably fastened to said cassette, wherein a majority of the screens in the reactor are rectangular and each screen is fixed to a cassette in each of its four corners by means of quick release means, enabling the screen to be fixed to or detached from the cassette by hand or by hand tools in less than 5 minutes.

2. Reactor according to claim 1, wherein the apertures of the screen each has an area of between 500 $mm^2$ and 0.1 $mm^2$.

3. Reactor according to claim 1, wherein the apertures of the screen each has an area of between 100 $mm^2$ and 1 $mm^2$.

4. Reactor according to claim 1, wherein the screen is made by woven wire mesh.

5. Reactor according to claim 1, wherein the screen is made by welded wires and rods.

6. Reactor according to claim 1, wherein the screen is made by a flat printed pattern.

7. Reactor according to claim 1, wherein the weight of the screen is below 100 kg.

8. Reactor according to claim 1, wherein the weight of the screen is below 25 kg.

9. Reactor according to claim 1, wherein the reactor is a hydroprocessing reactor, a hydrogenation reactor, a TIGAS reactor, or a methanation reactor.

* * * * *